United States Patent [19]

Ball et al.

[11] 4,054,984

[45] Oct. 25, 1977

[54] TOOL FOR JOINING AND SEPARATING PLASTIC PIPE JOINTS

[76] Inventors: Dorothy P. Ball, 1701 W. Second St., Ottumwa, Iowa 52501; Charles E. Ball, 1630 G Ave., Fort Madison, Iowa 52617

[21] Appl. No.: 755,731

[22] Filed: Dec. 30, 1976

[51] Int. Cl.$^2$ .......................................... B23P 19/04
[52] U.S. Cl. ...................................... 29/237; 29/238; 29/256; 269/43
[58] Field of Search ................. 29/237, 238, 239, 256; 269/43

[56] References Cited

U.S. PATENT DOCUMENTS

| 1,793,560 | 2/1931 | Schmieder | 269/166 |
| 3,364,555 | 1/1968 | Swink | 29/237 |
| 3,597,776 | 8/1971 | Saunders | 29/237 |
| 3,727,289 | 4/1973 | Bemelmann et al. | 29/237 |
| 3,831,256 | 8/1974 | Bjalme et al. | 29/237 |

*Primary Examiner*—James L. Jones, Jr.
*Attorney, Agent, or Firm*—Haven E. Simmons; James C. Nemmers

[57] ABSTRACT

A tool for joining and separating plastic pipe and their fittings employs a pair of clamps which are secured adjacent the ends of the pipe sections. The clamps in turn are slidable on a frame and operated by a toggle-type linkage which moves the clamps and pipe sections and fittings axially toward or away from each other.

5 Claims, 3 Drawing Figures

TOOL FOR JOINING AND SEPARATING PLASTIC PIPE JOINTS

BACKGROUND OF THE INVENTION

The joining and separating of plastic pipe sections secured by fittings having spiggoted type joints is not readily accomplished. Axially directed forces on the pipe sections must be used to join or separate them from the fittings, especially in the latter instance. An appropriate tool is needed for this operation in order to ease the problems otherwise encountered.

SUMMARY OF THE INVENTION

The present tool consists of an essentially triangular frame upon whose longest side member is mounted a pair of slidable clamps to which the pipe sections with their fittings are releasably secured in axial alignment by lengths of chain. The chains are adjustably secured at one end by spring biased retainers on one side of the clamps, pass around the pipe sections and are tightened or loosened by over-center catches on the other side of the clamps to which the other ends of the chains are secured. The clamps are pivotally connected to the ends of a pair of converting link bars within the frame whose other ends are pivotally connected to an internally threaded block. The latter block is engaged by a threaded shaft at right angles to the movement of the clamps, the exterior end of the shaft being equipped with a crank handle for rotating it. When the crank is turned, the toggle block moves in one direction or the other along the shaft, causing the link bars in turn with which it forms a toggle mechanism, to slide the clamps and thus the pipe sections secured to them toward or away from each other depending upon the direction of rotation of the shaft.

DETAILED DESCRIPTION OF THE PREFERRED EMMBODIMENT

A series of bars, 10a, 10b and 10c of rectangular section, are welded up to form an open perimeter from 10 of generally triangular shape. The longest bar 10a is joined at right angles at its ends by two shorter bars 10b and the latter in turn by two medium length bars 10c which converge and are secured to a bushing 11 opposite the mid point of the bar 10a.

Figure 1:
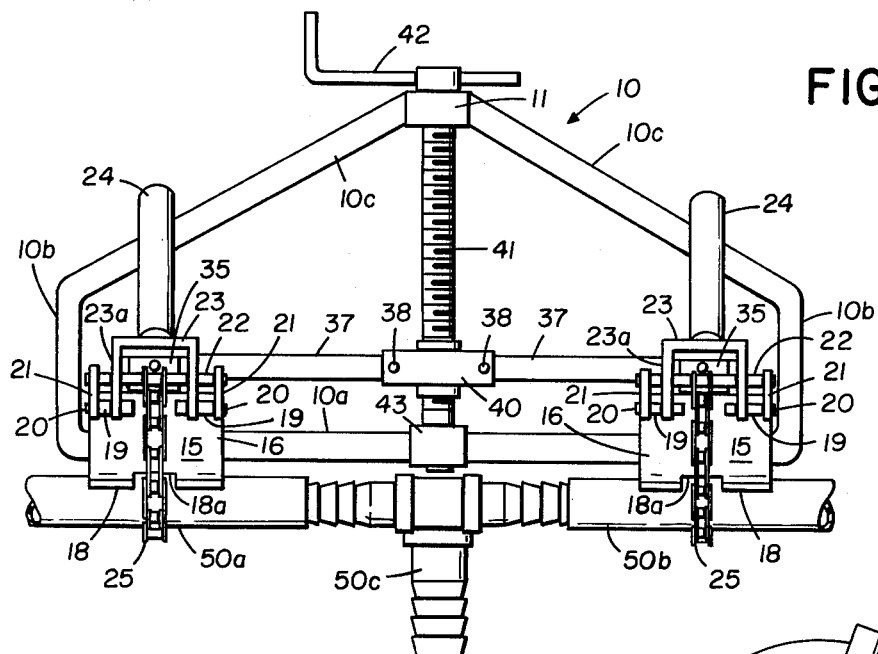
FIG. 1 is a side elevation of a tool according to the present invention illustrating the toggle linkage in the pipe separated position.
Figure 2:
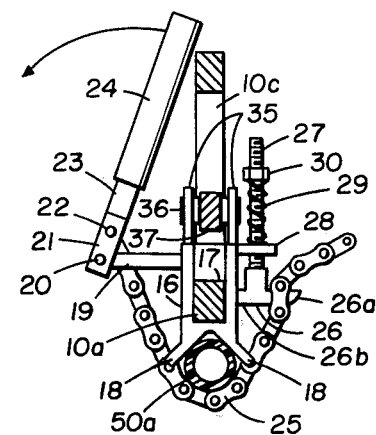
FIG. 2 is a sectional view taken along the line 2 — 2 of FIG. 1.

Two pipe clamps 15 are formed by clamp blocks 16 through which extend ways 17 enveloping the bar 10a so that the clamps 15 are slidable thereon. The blocks 16 may be each welded up from suitable flat and bar stock, as indicated in FIG. 2, and to their bottom faces in turn are welded short lengths of inverted angle iron to form V-seats 18, parallel to and below the frame bar 10a, to receive lengths of plastic pipe. To one longitudinal side wall of the clamp blocks 16 are welded bifurcated brackets 19 which extend laterally therefrom and into whose outer side edges are fitted short spindles 20 parallel to the frame bar 10a. Upon the spindles 20 are journaled the lower ends of two pairs of short links 21 which are connected at their upper ends by a pair of rods 22, also parallel to the frame bar 10a, which overlie and span the brackets 19 in FIGS. 1-3. The legs 23a of inverted U-shaped toggle levers 23 are journaled at their midpoints on the rods 22 and fitted at their yoked ends with operating handles 24. When in and approaching their positions shown in FIGS. 1 - 3, the outer ends of the legs 23a bear on recesses (not shown) in the tops of the brackets 19 which thus form fulcrum pivots for the toggle levers 23. Between the legs 23a and the ends of open link chains 25 are attached to the rods 22 and carried around under the pipe seats 18, through the apertures 18a in their lips, and up the other sides of the blocks 16. There, selected links of the chains 25 are hooked over the outer arms 26a of inverted T-shaped retainers 26 whose inner arms 26b slidably engage the adjacent wall faces of the blocks 16. The retainers 26 in turn are fitted with upstanding, threaded studs 27 which pass through apertures in laterally projecting brackets 28 welded to the adjacent faces of the blocks 16, the studs 27 above the brackets 28 being encompassed by compressible coil springs 29 captured between the brackets 28 and nuts 30.

To the top faces of the blocks 16 are welded upstanding cleves 35 between which, on transverse pins 36, are journaled the outer ends of toggle bars 37. The bars 37 converge and are pivoted on transverse pins 38 to cleves 39 formed on the opposite ends of a toggle block 40 which is internally threaded in alignment with the bore of the bushing 11. The toggle bars 37 and block 40 thus all move in the plane of the frame 10. Through the bushing 11 and the toggle block 40 extends a threaded shaft 41, its upper exposed end being headed at 41a and fitted with a hand crank 42 while its lower exposed end passes through and is held captive in a block 43 located midway along the frame bar 10a between the clamps 15. A "C"-type thrust washer 44 cooperates with the head 41a to locate the shaft 41 against axial movement.

Figure 3:
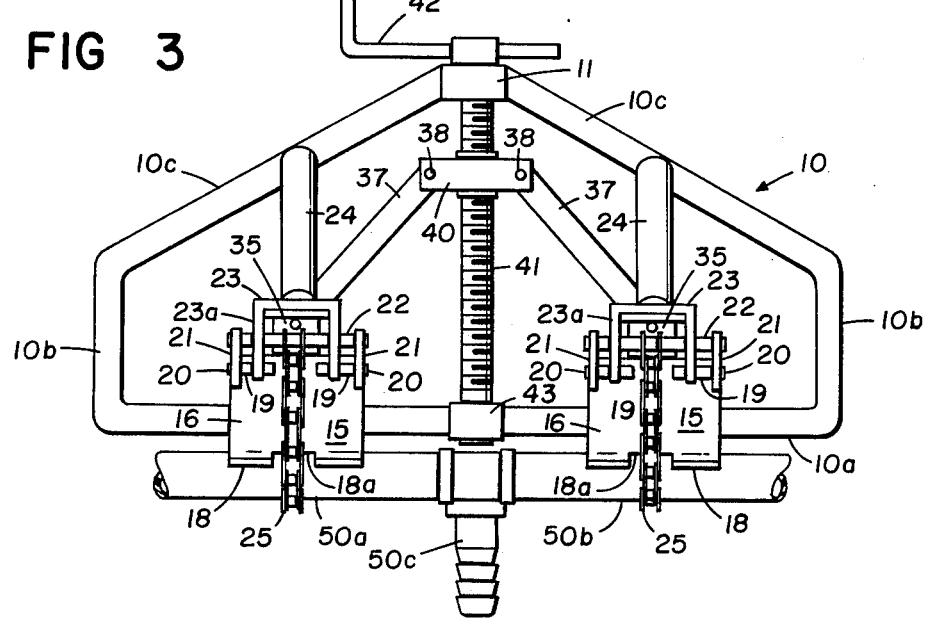
FIG. 3 is similar to FIG. 1 but illustrates the toggle linkage in the pipe joined position.
Figure 1:
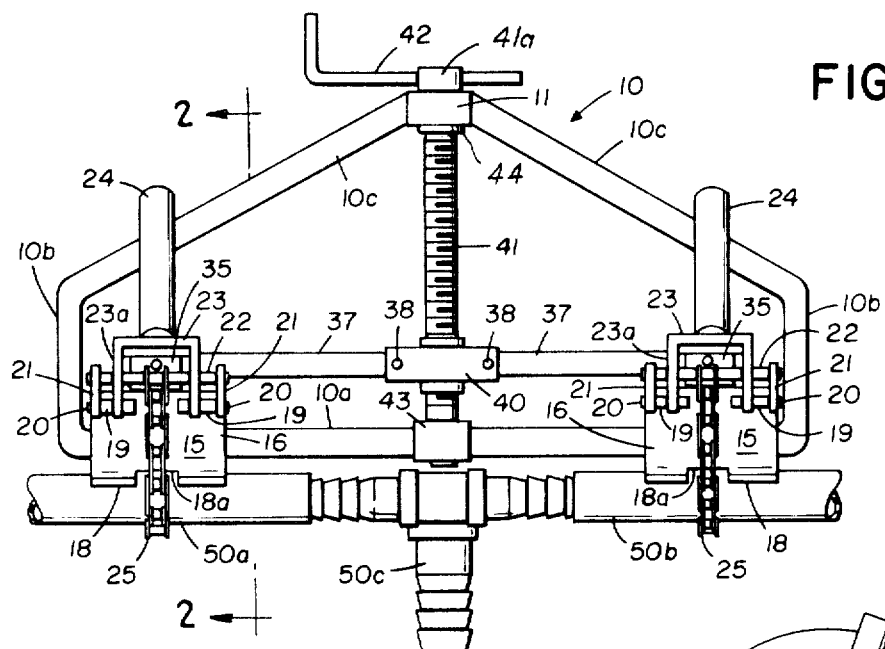
Figure 2:
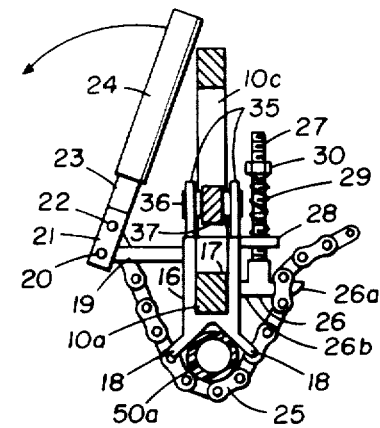
Figure 3:
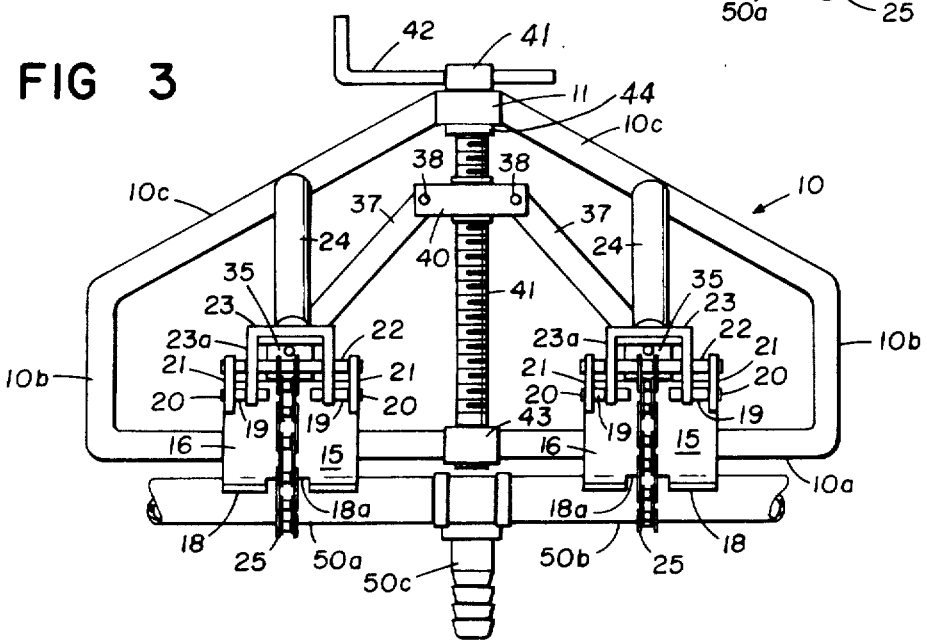

The ends of the plastic pipe concerned may be of the belled type or, as is common with plastic pipe and their fittings used for plumbing, the ends of the fittings are tapered and forced into the pipe ends, the ends of the fittings being provided with raised serrations thereabout which resist separation of the joint. The latter type is that to which the present tool is particularly directed and is the type illustrated. If two lengths of plastic pipe sections 50a and 50b of that type are to be joined for instance, to a fitting 50c, the latter is first started by hand into each pipe section 50a and 50b. Then the handles 24 are swung down and the chains 25 unhooked from the arms 26a. The crank 42 is rotated until the toggle block 40 is near the lower end of the shaft 41 so that the clamps 15 are spread apart on the frame bar 10a, all as shown in FIG. 1. The pipe sections 50a and 50b are then placed in the seats 18 with the fitting 50c between them and the chains 25 passed around them and hooked over the arms 26a. The nuts 30 can then be adjusted to cause the retainers 26 to pull the chains 25 just taut about the particular diameter of pipe involved. The handles 24 are then swung up and over the centers of the spindles 20, thus causing the rods 22 to tighten the chains 25 above the pipe sections 50a and 50b to hold them snugly in their seats 18. The resiliency of the springs 29, against which the over-center action of the rods 22 pulls the chains 25, can also be adjusted by the nuts 30 so that the plastic pipe sections 50a and 50b are not damaged by over-tightening of the chains 25. The crank 42 is then rotated to cause the toggle block 40 to rise toward the bushing 11 and thereby cause the toggle bars 37 to slide the clamps 15 toward each other, as shown in FIG. 3, to forcibly join the pipe sections 50a and 50b. Reversing the above procedure, of course, will cause the pipe sections 50a and 50b to be separated from the fitting 50c by the clamps 15 when the crank 42 is rotated in the opposite direction. Indeed, it is much more difficult to separate such joints, especially by hand, then it is to form them in the first place so that the present tool is particularly useful in that instance.

Though the present invention has been described in terms of a particular embodiment, being the best mode known of carrying out the invention, it is nevertheless not limited to that embodiment alone. Instead, the following claims are to be read as encompassing all adaptations and modifications of the invention falling within its spirit and scope.

We claim:

1. A tool for joining or separating plastic pipe sections comprising: an open, generally planar frame bounded by perimeter defining members including a rectilinear member; a pair of clamp members attached to and slidable toward and away from each other on the rectilinear frame member, each of the clamp members having means to releasable secure pipe sections thereto outside of the frame perimeter but in axial alignment with each other and parallel to the rectilinear frame member; and a toggle linkage, the toggle linkage including a pair of toggle bars pivotally connected at corresponding ends to respective ones of the clamp members and at their other corresponding ends to opposite ends of a toggle block, the toggle bars and block being disposed within the frame perimeter and all of said pivotal connections providing for movement of the toggle bars and block in the plane of the frame, the toggle block having an internally threaded bore between said pivotal connections thereto whose axis is normal to the rectilinear frame member and intersects the same between the clamp members, and an externally threaded crankshaft rotatably carried in the frame and located against axial movement relative thereto, the shaft threadedly engaging the toggle block bore.

2. The tool of claim 1 wherein each clamp member comprises a clamp block having a bore therethrough slidably receiving the rectilinear frame member, the block including a pipe seat outside of the frame perimeter, the seat having a longitudinally extending V-shaped section parallel to the rectilinear frame member.

3. The tool of claim 2 wherein said releasable means for each clamp member comprises a length of chain, one end of the chain being adjustably secured to retaining means disposed upon one longitudinal side wall of the clamp block and laterally offset from the plane of the frame, the chain being passable therefrom transversely across the pipe seat and securable at its other end to chain tightening means disposed on an opposite longitudinal side wall of the clamp block.

4. The tool of claim 3 wherein the chain is of the open link type and said retaining means comprises a hook member engagable within a selected link of the chain, the hook member including adjustable spring means providing for resilient tension upon the chain.

5. The tool of claim 4 wherein the chain tightening means comprises an over-center type mechanism including a U-shaped member pivoting at its outer ends on a bracket carried by said opposite clamp block side wall and about an axis parallel to the rectilinear frame member, said other chain end being fixed to the U-shaped member intermediate said pivot axis thereof and the yoked end of the U-shaped member, and an operating handle secured to said yoked end.

* * * * *

UNITED STATES PATENT OFFICE
CERTIFICATE OF CORRECTION

Patent No. 4,054,984         Dated   October 25, 1977

Inventor(s) Dorothy P. Ball et al

It is certified that error appears in the above-identified patent and that said Letters Patent are hereby corrected as shown below:

The one sheet of Drawing should be deleted and substituted with the attached sheet of Drawing therefor.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks